United States Patent [19]

Girguis

[11] Patent Number: 4,533,339
[45] Date of Patent: Aug. 6, 1985

[54] CONSTANT VELOCITY JOINT

[76] Inventor: Sobhy L. Girguis, Magdalenestr. 19, D-5210 Troisdorf-Oberlar, Fed. Rep. of Germany

[21] Appl. No.: 407,096

[22] Filed: Aug. 11, 1982

[30] Foreign Application Priority Data

Aug. 29, 1981 [DE] Fed. Rep. of Germany ....... 3134272

[51] Int. Cl.$^3$ .......................... F16D 3/22; F16D 3/30
[52] U.S. Cl. ..................................... 464/146; 464/906
[58] Field of Search ................. 464/144, 145, 146, 906

[56] References Cited

U.S. PATENT DOCUMENTS

| 2,046,584 | 7/1936 | Rzeppa | 464/146 X |
| 2,150,942 | 3/1939 | Rzeppa | 464/906 X |
| 2,150,952 | 3/1939 | Ward | 464/146 |
| 3,218,827 | 11/1965 | Aucktor | 464/146 |
| 3,464,232 | 9/1969 | Hutchinson | 464/146 |
| 3,557,572 | 1/1971 | Aucktor et al. | 464/146 |
| 3,696,638 | 10/1972 | Smith et al. | 464/146 |
| 3,928,985 | 12/1975 | Girguis | 464/146 |
| 4,385,899 | 5/1983 | Franklin, Jr. | 464/906 X |

FOREIGN PATENT DOCUMENTS

| 2164431 | 9/1973 | Fed. Rep. of Germany. | |
| 2015947 | 4/1978 | Fed. Rep. of Germany | 464/146 |

Primary Examiner—Stuart S. Levy
Assistant Examiner—Daniel P. Stodola
Attorney, Agent, or Firm—Hayes, Davis & Soloway

[57] ABSTRACT

A constant velocity joint has a hollow outer component with longitudinal tracks or ball races in its inner surface, an inner component inside the outer component, the inner component having tracks corresponding to those in the outer component, balls in the tracks of the outer and inner components for transmission of torque between the two and an apertured cage retaining the balls in a ball plane in its apertures. The cage has a convex control surface facing the outer component and a concave control surface facing the inner component. The planes of the mid points of the control surfaces are equally spaced on either side of the ball plane. The control surfaces have single radial centers and lie to the outside of the radial planes thereof running through their mid points, away from the ball plane. The remainder of the inner surface of the cage has a larger spacing from the radial center of the concave control surface that the radius of the concave control surface and/or the remainder of the outer surface of the cage has a smaller spacing from the radial center of the convex control surface than the radius of the convex control surface.

10 Claims, 11 Drawing Figures

CONSTANT VELOCITY JOINT

INTRODUCTION

The invention relates to a constant velocity joint having a hollow outer component provided with longitudinal tracks or ball races on its inner surface, an inner component located within the outer component with a space therebetween and having corresponding tracks provided on its outer surface, balls which are received in the tracks of the outer and inner component to permit transmission of torque, an apertured cage arranged in the space between the outer and inner component which retains the balls, in the apertures, in the homokinetic or ball plane. The cage has an outer convex control surface and an inner concave control surface, the mid points of which surfaces lie at both sides of, and at the same spacing from, the ball plane.

In known constant velocity fixed joints of this construction, the convex spherical control surface of the cage is guided in a concave spherical surface on the outer component and the convex spherically outer surface of the inner component is guided in the concave spherical control surface of the cage. For example, see U.S. Pat. No. 2,046,584. The control surfaces extend at both sides of the radial plane containing their mid point. It is necessary for the ratio between the spacing of the mid points of the control surfaces from the ball plane and the radius of the ball mid point—known as the offset—to be maintained at a very small value, to ensure an appropriate minimum track depth within the range of articulation of the joint, this being necessary both for the inner as well as in the outer component.

A small offset nevertheless has appreciable undesirable consequences for the design and operation of the joint. For example, a very close fit between the parts of the joint is necessary, which increases manufacturing costs, and frustrates the provision of minimum clearance to allow for thermal expansion. Additionally, the control forces are, as a result of the short lever arms correspondingly increased. As a result of this, the cage, the balls and the tracks are subject to high loadings and the working life of the joint is significantly reduced.

If one were to increase the offset, it would be necessary to reduce the minimum track depth, so that once again the balls and the tracks and, as a result of this, the cage as well, would be subject to high loading or, respectively, the maximum torque which could be transmitted would be smaller. Larger minimum track depths on the other hand, do also allow larger angles of articulation of the joint.

Furthermore, in the case of the previous design, it is necessary for the assembly of the inner component into the cage for the cage to be provided with relatively long retangular apertures to thread the inner component, rotated through 90°, into the cage. As a result of this, the cage is weakened as regards its symmetry of rotation. When assembling this joint, after the inner component has been assembled into the cage and the cage has been fitted into the outer component, the inner component must be inclined through about 90° with respect to the outer component when the balls are being inserted. This makes it necessary for the inner component to be formed as a hollow part which is joined to the shaft by means of a spline fitting or the like. As the dimension the spline fitting as well as the wall thicknesses of the inner component must be sufficient to meet the maximum torque requirements for a given size of the joint, it is necessary to limit the size of the balls and consequently, the amount of torque to be transmitted, which depends on the size of the latter.

In the case of another type of constant velocity joint, taking the form of a telescoping or plunging joint, see West German Pat. No. 1 297 415, the convex spherical control surface of the cage is guided in a concave cylindrical surface of the outer component and the convex spherical surface of the inner component is guided in the concave spherical control surface of the cage. The control surfaces of the cage are arranged symmetrically. To make a bayonet-type axial assembly of the inner component into the cage possible, a cylindrical recessed passage is provided at one end of the ball cage extending into the cage apertures the diameter of which is greater than the outer diameter of the inner component. The relationship between the offset and the minimum track depth is, in this case as well, essentially determined. The track depth is further reduced as a result of the fact that the maximum diameter of the recessed passage, and consequently the outer diameter of the inner component, is limited by the position and the radial motion of the balls in the cage aperture. If one increases the offset, then the radial movement of the balls in the cage aperture is increased and the minimum track depth is further reduced. See West German Pat. No. 2 164 431. The unavoidably high control forces lead, in this design of joint, to high wear on the convex control surface of the cage, because in this case this surface has line contact with the outer component. Wear on the cage at this point leads to over-controlling of the homokinetic plane with the result that the tracks are overloaded leading to an accelerated reduction in the working life of the joint. Consequently, the joint can in practice only be employed where relatively small angles of articulation are required.

THIS INVENTION

The present invention overcomes the disadvantages existing in known joints of this type and provides an improvement in the working life and/or extends the admissible angle of articulation, this being achieved in an advantageous fashion using inner components which can be assembled axially.

In accordance with the invention, the design of the cage and consequently of the inner component and/or outer component can be freely adapted in the remaining area not involved in providing the control surfaces, in such a way, that the track depth is made larger in a region where, in the existing state of the art, it is becoming smaller.

In the design in accordance with the invention, the inner component can, in the stated region, be for example cylindrical or conical, so that the minimum track depth can be correspondingly increased. Alternatively, where the track depth is not to be increased, the offset can be appreciably increased. The improvement in the offset and/or the track depth conditions can be optimised to give the best possible result for a particular application.

With joints of this type the control surfaces are not subject to loading over their whole areas. When one is considering control surfaces with surface contact, a reduction in the width of the control surfaces does not bring about a harmful increase in the pressure per unit area because only the surfaces away from the ball plane are subject to loading as a result of torque. When one is dealing with line contact plunging joint in, the pressure per unit of area is not altered as a result of quasi halving the size of the control surface because only the surfaces away from the ball plane are in fact subject to loading. More significant for the reduction in pressure per unit of area is the increase in the offset or, in the lever arm and/or the increase in the minimum track depth resulting in a reduction in the internal loading forces of the joint. The service life increases by about the cube of the reduction in the loading.

In the case of constant velocity joints subjected to additional axial forces or in which, as a result of inaccuracies, irregularities or the like, security of operation in the axial sense becomes necessary, a further feature of this invention provdes for the inner component to be fixed in the axial sense with respect to the cage and/or the cage to be fixed or held in the axial sense with respect to the outer component and/or the inner component to be axially held with respect to the outer component in the opposing direction of the control surfaces.

The axial fixing can be arranged independently of the control surfaces with the advantage that such fixing arrangements can be optimally designed to correspond to the expected axial loading on the joint both as regards intensity and frequency.

Thus, for example, the axial fixing can be done using a force locking arrangement employing spiral tracks or spring components. Another possibility provides for the axial fixing to be done using positive locking arrangements employing limiting surfaces which run concentrically to the control surfaces.

In an advantageous refinement of this invention, the axial fixing is made use of to provide auxiliary control to the main control of the joint and providing for the control surfaces to start at a distance from the radial plane passing through their mid point. By means of this the design of the joint is still further improved. The axial fixing produces a force which is directed outwardly and this consequently urges the spherical surfaces outwardly to a greater extent as a result of which the control surfaces can be shortened still further.

If fixing is provided by using spring components, these press the inner component, for example without play, into the concave control surface of the cage, thus improving the control. As a result of the axial spring force, the point of contact between the concave surface and the inner component is removed still further from the homokinetic plane.

The spiral-shaped tracks on one part of a constant velocity joint necessitate the use of oppositely-directed spiral-shaped tracks on the other part. The crossing tracks introduce, as known per se, additional control and additionally produce an axial force, which is dependent upon the torque, which can take over the function of providing the axial fixing of the joint.

In the case of fixing using a positive locking arrangement, this, in principle, also occurs outside the main loading region of the ball tracks, as a result of which the latter can be designed with greater freedom and more reliability.

It is advantageous if the cage is fixed in the outer component in bayonet fashion, and if the side directed towards the ball plane, in the region of the inner component, has a cylindrical shape with a radius which is at least as large as the largest diameter of the inner component and if the inner component is of such a construction that it can only be assembled when the joint is straight. For this design, the inner component can be provided with a conical surface. In this embodiment, the first step is to assemble the cage into the outer component. One may be dealing here either with a fixed or telescoping joint. Next, the balls are inserted from inside the cage, through the cage apertures, into the tracks of the outer component. Following this, the inner component is mounted in the axial direction.

In another embodiment, the cage is fixed in the outer component in bayonet fashion, and the side directed towards the ball plan can be provided, in the region of the inner component, with grooves the spacing of which from the axis of rotation of the inner component is at least as large as the largest diameter of the inner component, whereby the grooves correspond with the contour, or respectively the webs, of the inner component. Assembly is then carried out in the same manner as described above. The grooves now lie in the region of the webs between the cage apertures. Axial fixing is achieved as soon as the joint is inclined.

An extension of this fixing in the 0° region can be achieved by arranging for the grooves to be staggered in the peripheral direction at a spacing with respect to the webs of the cage which is larger than half the difference between the aperture length and the ball diameter. In this case, assembly is carried out in the manner described above and it is only necessary for the cage, when the inner component is being pushed in, to be rotated out of its mid position in a direction of rotation against the balls, this being done within the elastic limits of the joint.

The design of a plunging joint in accordance with this invention is accomplished by providing for the concave cylindrical surface of the outer component to have a length which corresponds to the length of plunging travel, and for the tracks, in their main direction, to run parallel to the axis or to run in screw fashion.

As an extension of the basic idea of this invention for a fixed joint and for the purpose of optimizing the track depth whilst at the same time reducing manufacturing costs, the radii of the track axes of one joint component, starting approximately from the ball plane, can run, in their main direction, parallel to the main axis in the region of the control surfaces of this joint component whilst, in other regions, they can steadily decrease, with the tracks of the other joint component being a mirror image of this, when viewed from the ball plane.

As a result of this, the track depth in the region of the angle of inclination is reduced. Additionally, the tracks in the inner and outer components are free of undercuts so that their manufacture is possible using axial metal shaping processes, such as cold impact pressing or sintering as well as electrolytic erosion processes.

THE DRAWINGS

The invention will now be described, by way of example, with reference to the accompanying drawings, in which.

DESCRIPTION

Figure 1:
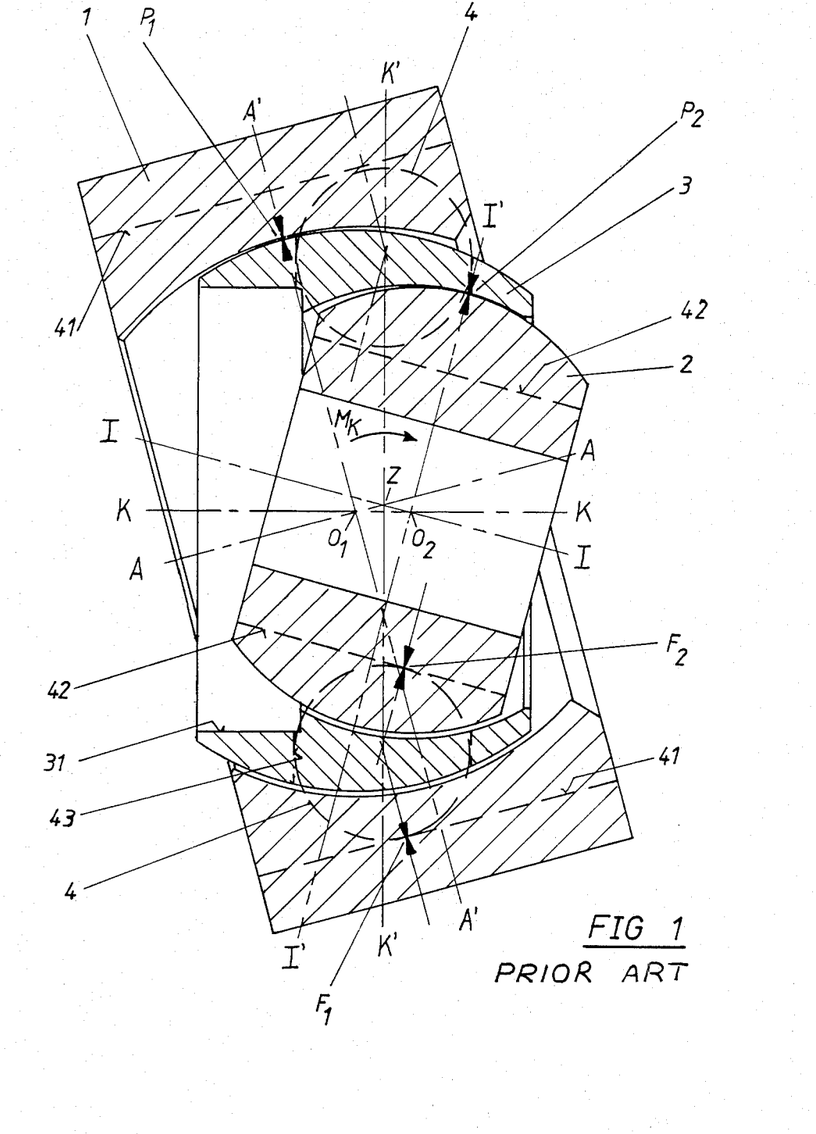
FIG. 1 is an axial section through a constant velocity joint of conventional design in the inclined position showing diagrammatically, the play and loading relationships.

FIG. 1 shows the outer component 1, the inner component 2, the cage 3, balls 4, recessed passage 31, tracks 41 and 42 which are parallel to the axis in the outer component and in the inner component, and cage aperture 43. The clearances in the joints have been exaggerated for the purpose of clarification. AA is the axis of rotation of the outer component, II is the axis of rotation of the inner component and KK is the axis of rotation of the cage. $O_1$ is the mid point of the convex control surface of the cage, $O_2$ is the mid point of the concave control surface. A'A' is the vertical plane of the outer component passing through $O_1$. K'K' is the ball mid point plane which will be referred to as the homokinetic or ball plane. Z is the point where the axes AA and II as well as the ball plane cross and is the kinematic center of articulation of the joint.

When the joint is subjected to torque the cage becomes subjected to a tilting moment, see West German Pat. No. 23 23 822, which tilts the cage in a certain axial plane about Z in the direction of the tilting moment or, respectively, in the direction of arrow $M_K$. The cage is supported by means of its control surfaces on the corresponding surfaces of the outer and inner components at two points. These points, shown as $P_1$ and $P_2$ must lie respectively in the planes A'A' and I'I', since these planes are at right angles to the effective lever arms $ZO_1$ and $ZO_2$. These planes, where the cage gets its support, lie, when the joint is in the straight position, parallel to the ball plane and move away from the ball plane as the angle of articulation increases. Consequently, only the side of the control surfaces which is away from the ball plane is loaded due to the torque or, respectively, due to the tilting moment. The other side of the control surfaces acts where axial forces are to be taken up. This nevertheless requires the use of the most important part of the joint area, i.e. the part where torque transfer occurs most frequently or where it is performed exclusively.

To complete the picture, it should be mentioned that, as a result of the tilting moment of the cage, the inner component, depending on the play relationships and track shapes, positions itself eccentrically with respect to the outer component so that the balls are subject to a greater degree of play in the rotational region where the cage is supported and to a reduced amount of play in the opposite region. They are supported at points $F_1$ and $F_2$ on the track 41 and 42.

Figure 2:
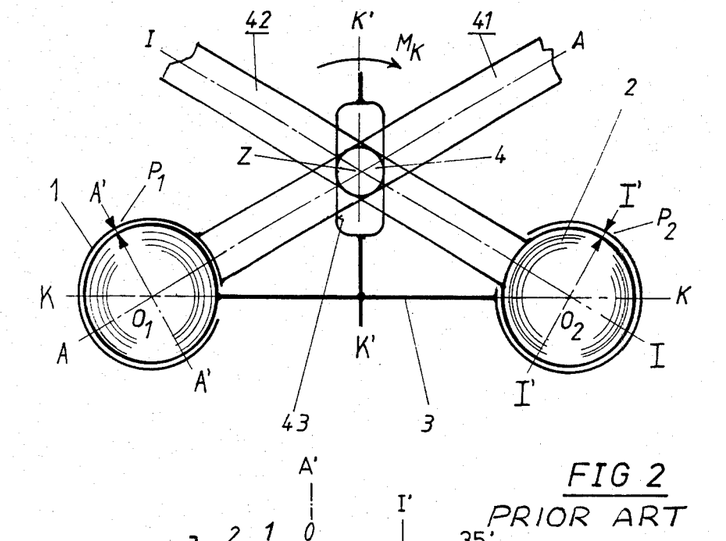
FIG. 2 is a sketch illustrating the position of the loading on the control surfaces shown in FIG. 1.

FIG. 2 shows a diagrammatical representation of FIG. 1, in which the reference numerals from FIG. 1 are repeated. The cage is shown in its unloaded state. When it is subject to torque loading, the cage moves in the direction $M_K$ about point Z, so that the points $P_1$ and $P_2$ bear respectively against the outer and inner components. If one is dealing with a telescoping joint with a hollow cylindrical outer component, the point of contact $P_1$ does not change.

Figure 2A:
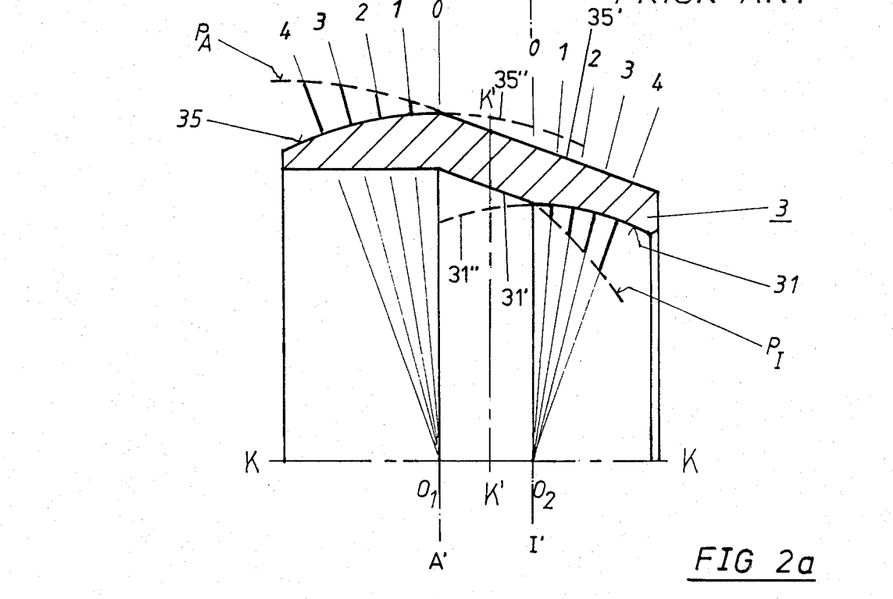
FIG. 2a is a sketch illustrating the position and intensity of the loading on the control surfaces of a cage in accordance with the invention.

FIG. 2a shows a half sectional view of the cage 3, in which the control surfaces 35 and 31 are designed in accordance with the invention. The mid points $O_1$ and $O_2$ of the control surfaces 35 and 31 lie on the cage axis KK at the same distance from the ball plane K'K'. As can be seen, control surfaces 31 or 35 exist only—starting from the line I'I' or, respectively, A'A'—on the sides away from the ball plane K'K', and are the only surfaces subject to loading. The side 31' of the cage towards the ball plane K'K' exhibits a larger spacing from the mid point $O_2$ than the radius of the control surface 31. The side 35', away from the ball plane K'K' exhibits, on the other hand, a smaller spacing from the mid point $O_1$ than the radius of the control surface 35. The paths of the curves which the stated sides 31' and 35' follow in accordance with the previous state of the art are shown by means of dashed lines 31" and 35". As will readily be seen, this means that it is possible to significantly increase the minimum track depth and/or the offset, i.e. the spacing of the mid points $O_1$ and $O_2$ from the ball plane K'K'.

The lines 0, 1, 2, 3, 4 shown radiating from $O_1$ amd $O_2$ passing through the respective control surfaces 35 and 31 show the position of the cage loading, at angles of articulation of 0°, 10°, 20°, 30° and 40°. With a constant torque, the tilting moment increases, as a first approximation, proportionally to the angle of articulation. if the supporting force is plotted on the control surfaces in the direction of the radiating lines, At least as the general trend, the curve of the supporting force will lie along lines $P_A$ and $P_I$. From this diagram it is also possible to see that not only half of the control surfaces is subject to loading, but also the fact that as the loading increases, the point of loading increasingly moves away from the ball plane.

Figure 3:
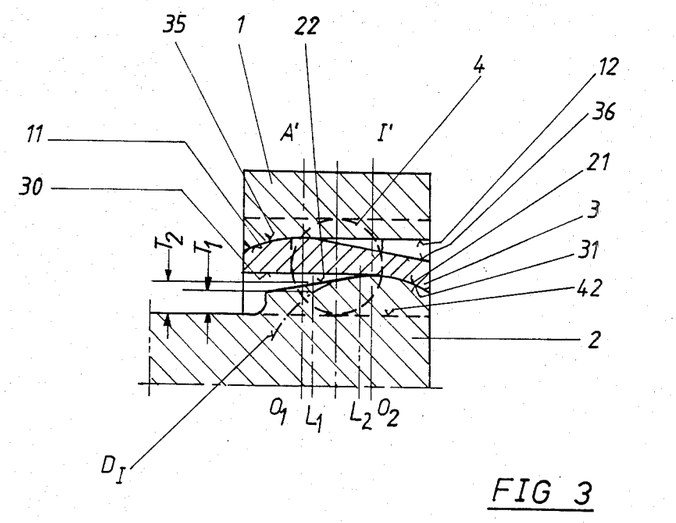
FIG. 3 is a half section of a joint in accordance with the invention with a conical inner component.

FIG. 3 shows outer component 1 and inner component 2, between which the cage 3 is controlled. The concave control surface 31 runs up to the plane of symmetry I'$O_2$, in which $O_2$ is the mid point of the control surface at this plane. Surface 31 goes into surface 30, which thereafter has a cylindrical shape. The contour of the inner component matches the inner contour of the cage so that initially the convex surface 21 lies against the control surface 31, and this is followed by the conical surface 22. The half angle of the cone corresponds to half the maximum angle of articulation of the joint. The concave surface 11 of the outer component 1 also extends up to the plane of symmetry A'$O_1$, following this the surface 12 is cylindrical. The cage control surface 35 also is spherical, and followed by the conical portion 36. The half angle of the cone is as large as half the maximum angle of articulation of the joint. For the purposes of comparison, the dashed-dotted line $D_1$ has been shown, as was done above, to indicate the contour of the inner component in constructions known to date. As will be seen, the invention allows the possible track depth to be considerably improved.

The balls 4 move along the tracks 42 of the inner component 2, at the maximum angle of articulation, until they reach planes $L_1$ and $L_2$. The track depths, $T_1$ and $T_2$, as shown correspond to what exists in the case of known constructions compared to a design in accordance with the invention. One particular feature of this design consists in the fact that the inner component 2 can only be removed from the cage 3 when the joint is in the straight position. When the joint is articulated, the axis of the inner component is inclined with respect to the axis of the cylindrical part 30 as a result of which the inner component can no longer be retracted in this position.

Figure 4:
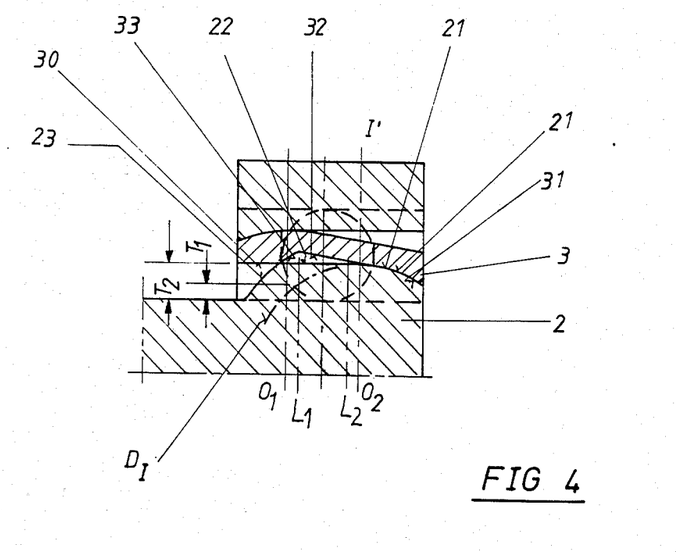
FIG. 4 is a half section of a joint in accordance with the invention with a cylindrical inner component.

In FIG. 4, the concave control surface 31 of the cage 3 changes over to a conical surface 32 which becomes progressively wider. Following this, the surface 33 is spherical and designed to be concentric with surface 31. The inner component 2 is also spherical in the region 21 up until the plane of symmetry $I'O_2$, and following this, in the region 22, it is cylindrical. The surface 23 of the inner component is also concentric with respect to the control surface 31. The cylindrical passage 31 in the cage is about as large as the outer diameter 22 of the inner component. In the case of this arrangement as well, withdrawal of the inner component becomes impossible if the joint is articulated even slightly since the surface 23 becomes covered by surface 33. The dashed line $D_1$ corresponds to the shape of the inner component in the case of previously known structures. The balls run along their tracks right up to the planes $L_1$ and $L_2$ at the maximum angle of articulation. $T_1$ indicates what the track depth would be in the case of previously known constructions and $T_2$ is the track depth in this embodiment of the invention. The larger the offset or the angle of articulation, the greater is the difference between $T_1$ and $T_2$. In FIGS. 3 and 4 the convex control surface of the cage is in accordance with the prior art.

Figure 5:
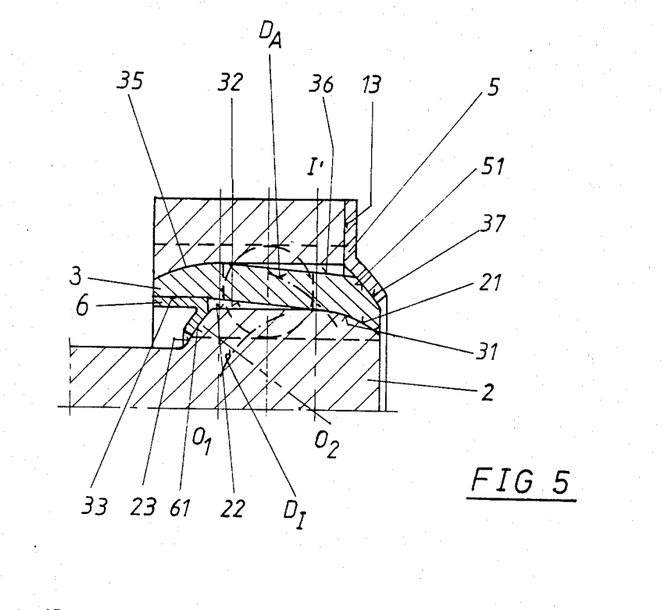
FIG. 5 is a half section of a joint in accordance with the invention provided with axial fixing of the cage to the outer and inner component.

In FIG. 5, the inner contour of the cage 3 is similar to that in FIG. 3 and consists of concave surface 31 with mid point $O_2$, tangential conical surface 32 followed by cylindrical surface 33. The spherical surface 21 of the inner component 2 with mid point $O_2$ runs up to the plane of symmetry $I'O_2$, this is followed by the cylindrical surface 22 and then by the spherical surface 23 with mid point $O_2$. A retaining ring is introduced and fastened at the cylindrical surface 33 of cage 3. The concave surface 61 of the ring 6 also has $O_2$ as its mid point and lies against the spherical surface 23 of the inner component. By this means, the inner component 2 is fixed axially to the cage 3. The axial fixing is achieved outside of the region of loading of the tracks and balls in the inner component. Ring 6 may be a spring component or it may be rigid, depending on the particular requirements. The mid angle between the surface 61, $O_2$ and $I'$ is, with this arrangement, larger than the corresponding angle in the case of previous constructions, so that an axial radial components of the force, termed the explosive or bursting force, are reduced and the cage 3 is consequently subject to reduced loading. The spherical control surface 35 of the cage 3 has the offset point $O_1$ as its mid point. The surface 36 runs tangential to this and takes the form of a conical surface and this is followed by surface 37 which is also spherical and has its mid point at $O_1$. Here as well, retaining ring 5 is fastened to planar surface 31 of the outer component. The concave surface 51 of ring 5 bears on surface 37 to hold the cage, with form or resilient locking as desired. The explosive force in this embodiment produced by an axial force is smaller than in the case of similar prior constructions.

The contour of a spherically designed inner component in accordance with the state of the art prior to this invention is shown by the dashed-dotted line $D_1$. The contour $D_4$, shown in dashed-dotted lines, also corresponds to that of known constructions with the same value for the offset as represented. It can be seen that it would be virtually impossible to produce a cage having this contour, independently of the reduced track depth on the inner component.

Figure 6:
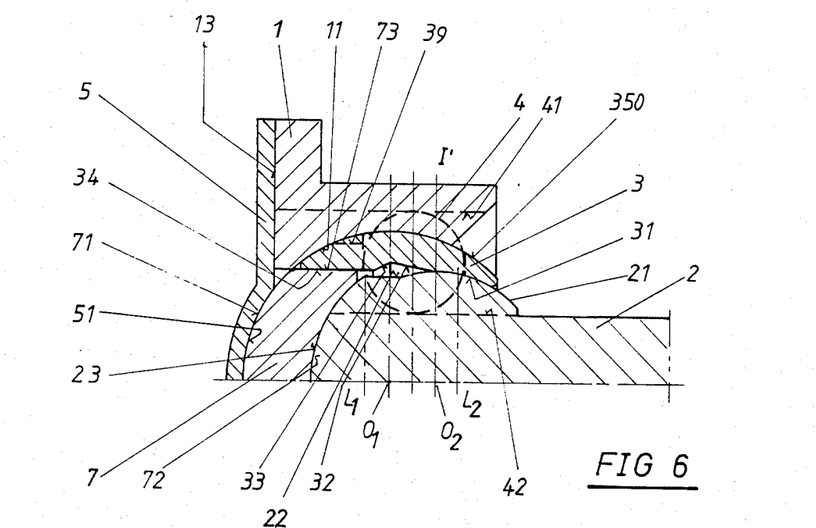
FIG. 6 is a half section of a fixed joint in accordance with the invention in which the inner component is axially fixed with respect to the outer component.

FIG. 6 shows a fixed joint in which the cage 3 is guided, by means of its convex surface 350 in the concave surface 11 of the outer component 1. The dashed line 39 corresponds to grooves, which are parallel to the axis, on the cage 3 in the region of the middle of the apertures. This permits bayonet-type assembly of the cage 3 in the outer component 1. See, for example, West German Patent Application No. 21 14 536. The inner contour of the cage 3 is provided with the concave control surface 31, which runs up to the plane of symmetry $O_{2I'}$. This is followed by the conical surface 32 and the concentric spherical surface 33. In the thicker part of the cage, a hollow cylinder 34 is provided for axial introduction of the inner component 2. The contour of the inner component comprises convex surface 21, cylinder 22 and, following this, spherical surface 23 which mainly has the task of fixing the inner component. On the planar surface 31 of the outer component 1, a retaining piece 5 is attached which has a concave surface 51 in the region of the axis of rotation, surface 51 having the same diameter as the concave inner surface 11 of the outer component 1. Here, attachment between the inner and outer components is achieved using a retaining piece 7 which has a concave surface 72 that bears against the surface 23 of the inner component, and a spherical surface 71 which bears against the concave surface 51 of piece 5 or, upon inclination, also on the concave surface 11 of the outer component. The cylindrical diameter 73 of piece 7 mates with the hollow cylindrical diameter 34 of cage 3. To carry out assembly, the balls, after the cage has been installed in the outer component, are fed from inside through the apertures into the tracks in the outer component 41, and this is followed by insertion of the inner component 2, piece 7 and, following this, piece 5. Balls 4 move along track 42 of the inner component 2 up to the planes $L_1$ and $L_2$ at the maximum angle of articulation.

Figure 7:
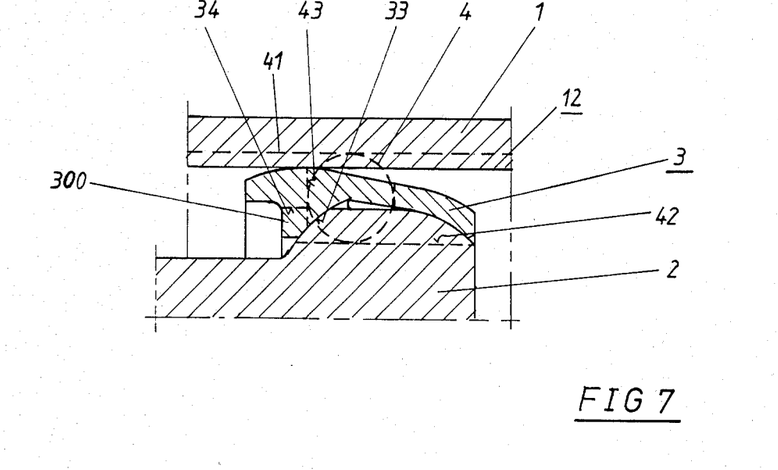
FIG. 7 is a half section of a telescoping joint in accordance with the invention, in which the inner component is fixed axially to the cage using a positive locking arrangement.

Cage 3 shown in fig. 7 corresponds essentially to the cage shown in FIG. 5, but here the retaining surface 33 is provided in one piece with the cage. Axial grooves 34 in retaining ring 300 are located in the region of the middle of the apertures in the cage so that bayonet-type assembly can be effected. Balls 4 are pushed from the outside through the cage apertures 43 into the tracks 42 of the inner component 2 and, following this, the whole assembly is inserted into the outer component 1.

Figure 8:
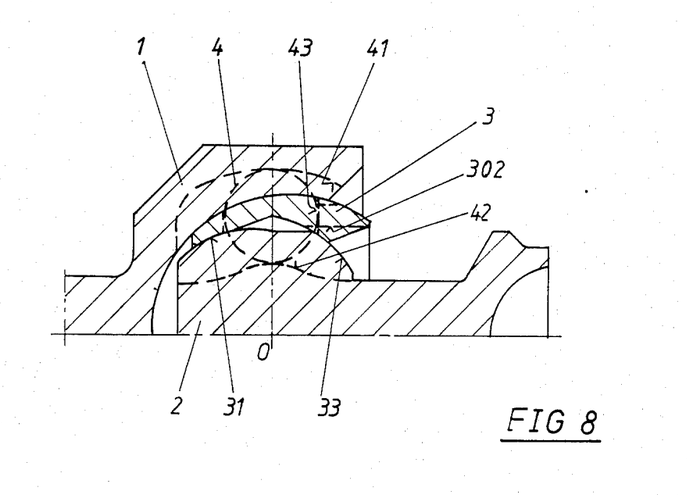
FIG. 8 is a half section of a fixed joint having circular tracks in accordance with the invention.

FIG. 8 shows a fixed joint, in which the tracks 41 of the outer component 1, and 42 of the inner component 2, are circular with their mid point at 0. The concave control surface 31 of cage 3 is, in accordance with the invention, of asymmetrical construction. The attachment surface 33 is also provided on the thick side of the cage. To allow assembly of the inner component into the cage, grooves 302 are provided on the periphery of the cage. These correspond to the contour of the inner component. In the rotational direction of the cage, the grooves are positioned outside the planes of the webs between the cage apertures so that axial assembly of the inner component is only possible using additional rotation of the cage. It is possible to rotate the cage in the direction of rotation with respect to the outer component 1, as long as the lengths of the cage apertures 43 allow this. If the cage is now subjected to torque within the elastic deformation of the joint, it is possible to rotate it further by small amounts to a few tenths of a millimeter. It is precisely in this position that the grooves 302 are placed, so that the inner component 2 can be assembled into the cage 3. In practice, the inner component 2 is mounted axially until the flanks of the tracks 42 take over the function of rotating the cage. As soon as the inner component 2 becomes located in its end position, the cage springs back by an amount corresponding to its elastic deformation and prevents the inner component from coming out. Grooves 32 should be staggered in the direction of rotation opposite to the direction in which the cage rotates as it wanders under loads produced by friction and play. Latching mechanisms or rotational locking of the cage to balls 4 can also be used to hold the assemble together in accordance with this principle.

Figure 9:
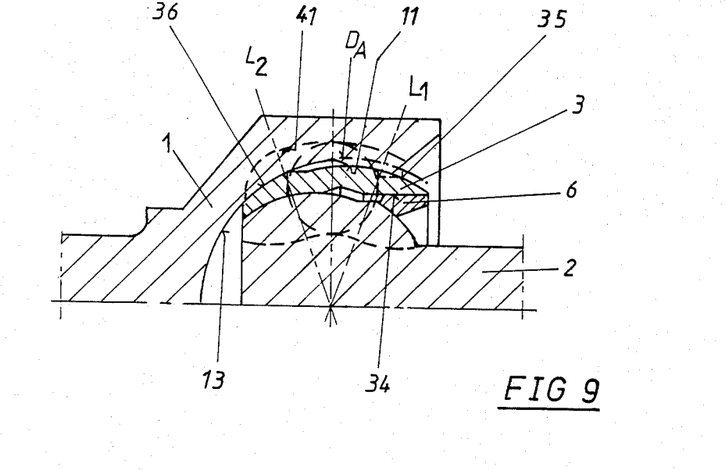
FIG. 9 is a view similar to FIG. 8, in which both control surfaces of the cage are designed in accordance with the invention.

FIG. 9 is very similar to FIG. 8 but exhibits the following differences: The convex control surface 35 of the cage 3 bears against the concave surface 11 of the outer component 1. Axial restraining surface 13 in the outer component and 36 in the cage are provided as shown. As a result, the minimum track depth of the tracks 41 in the outer component is increased in the region of the maximum angle of articulation shown by plane $L_1$. The interrupted line $D_A$ would otherwise be the contour of the outer component in the case of prior art constructions. This provision is useful here to the extent that the track depth is increased in the position where it has a minimum value in the region of the maximum angle of articulation. The same holds for the inner component 2. In the other maximum angle region shown by plane $L_2$, the track depths are automatically greater. The fixing of inner component 2 to cage 3 is achieved using an annular retaining ring 6 attached to the cage introdution opening 34, after assembly, using welding, bonding or a threaded arrangement. The design in FIG. 9 illustrates with respect to the convex surface of cage 3, a kinematic reversal to the solutions shown in the previous figures. In this case, the outer diameter of the control surface 35 of cage 3 is in fact correspondingly reduced, as a result of which the track depth can be increased in the outer component.

Figure 10:
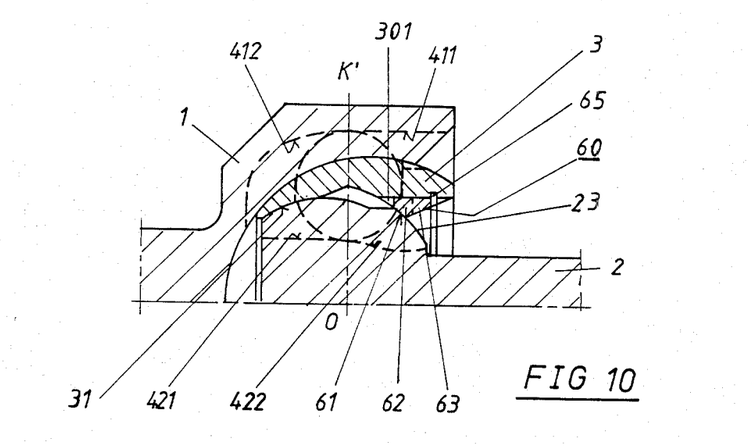
FIG. 10 is a half section of a fixed joint in accordance with the invention having tracks with no undercut.

A further way of achieving the best possible value for the track depth is shown in FIG. 10. In this case, the tracks 412 and 411 of the outer component 1 differ. Track 412 is circular with the mid point 0 as its center, whilst track 411 runs parallel to the axis. As is known, it is necessary for the track axes of the inner component 2 to be a mirror image of 411 and 412 with ball plane OK' being the plane of the mirror. Thus, the track 422 of inner component 2 is formed with its mid point at 0, whilst, following this, the other half of the mirror track 421 runs parallel to the axis.

As a result of providing straight track halves 411 in the outer component 1 and 421 in the inner component 2, optimization to completely circular tracks is achieved as follows. The track depth of the half track 421 in the region of the concave control surface 31 of cage 3 is reduced, but this nevertheless occurs at the position where, in the case of a full circle design (FIG. 9) this was excessive. On the other hand, in the region of the track 411, the track depth is increased by the track being parallel to the axis where it is important to achieve a greater degree of balance of the tracks and a higher performance of the joint. The track path does by no means need to follow a mathematical relationship such as a cicrular path or a straight line. The essential question is that of ease of manufacture. To assemble the inner component 2 into the cage 3, grooves 301 are provided located in the region of the webs between the cage apertures. A retaining ring 60 is provided to hold the assembly at an angle of articulation of 0°. It is also axially mounted and consists of raised parts 62 which fill the grooves in the cage. The raised parts have a concave inner surface 61, which bear against the surfaces 23 of inner component 2. The second part 63 of ring 60 is annular in shape and essentially has the task of retaining the position and, possibly, guiding the raised parts. The second part 63 can however be recessed between the raised parts and, in the extreme case, may consist of several sub-parts. Basically, only one raised part is necessary. To provide axial security, a safety ring 65 is used located in a suitable groove in cage 3.

I claim:

1. In a constant velocity joint having a hollow outer component with longitudinal tracks in its inner surface, an inner component placed in said outer component with annular space therebetween, said inner component having tracks in its outer surface corresponding to those in said outer component, balls in said tracks of said outer and inner components for transmission of torque between the two, a cage having an axis and arranged in said annular space and having apertures retaining said balls in a ball plane, said cage having a spherical concave control surface having a concave center of curvature, said concave control surface facing a mating surface of said inner component, said cage having a convex spherical control surface having a convex center of curvature, said convex control surface facing a mating surface of said outer component, said concave and convex centers of curvature being located on said cage axis and being equally spaced on either side of said ball plane; the improvement comprising having said concave control surface extending substantially from a radial plane parallel to the ball plane and containing said concave center of curvature to the side remote from said ball plane, all other points on the remainder of the inner surface of said cage having a distance from said concave center of curvature greater than the radius of said concave control surface, said mating surface of said inner component passing substantially through said radial plane containing said convex center of curvature, that portion of said inner component on the side of the radial plane remote from the ball plane having a radius of curvature matching the radius of curvature of said concave control surface, the remainder of said outer surface of said inner component having a substantially similar contour as that of said inner surface of said cage when articulated around said concave center of curvature by half the maximum joint angle to provide an increased depth of ball track in said inner component as compared to an inner component of uniform radius of curvature.

2. The constant velocity joint of claim 1, wherein the inner surface of said cage from the concave radial center towards the said ball plane has a cylindrical shape.

3. The constant velocity joint of claim 1 in the form of a telescoping joint wherein the inner cylindrical surface of said outer component has a length corresponding to that of the telescoping travel.

4. The constant velocity joint of claim 3 wherein said tracks run in screw fashion.

5. In a constant velocity joint having a hollow outer component with longitudinal tracks in its inner surface, an inner component placed in said outer component with annular space therebetween, said inner component having tracks in its outer surface corresponding to those in said outer component, balls in said tracks of said outer and inner components for transmission of torque between the two, a cage having an axis and arranged in said annular space and having apertures retaining said balls in a ball plane, said cage having a spherical concave control surface having a concave center of curvature, said concave control surface facing a mating surface of said inner component, said cage having a convex spherical control surface having a convex center of curvature, said convex control surface facing a mating surface of said outer component, said concave and convex centers of curvature being located on said cage axis and being equally spaced on either side of said ball plane; the improvement comprising having said convex control surface extending substantially from a radial plane parallel to the ball plane and containing said convex center of curvature to the side remote from said ball plane, all other points on said outer surface of said cage adjacent to said convex control surface having a distance from said convex center of curvature less than the radius of said convex control surface, said mating surface of said outer component passing substantially through said radial plane containing said convex center of curvature, the remainder of said inner surface of said outer member having a substantially similar contour as that of said outer surface of said cage when articulated around said convex center of curvature by half the maximum joint angle.

6. The constant velocity joint of claim 5 wherein the inner surface of said cage adjacent to said concave control surface is cylindrical, with a diameter equal to the diameter of said concave control surface.

7. The constant velocity joint of claim 5 wherein the inner surface of said cage adjacent to said concave control surface is conical, with increasing diameter in the direction towards said ball plane.

8. The constant velocity joint of claim 5 wherein the outer surface of said cage adjacent to said convex control surface is conical, with decreasing diameter in the direction towards said ball plane.

9. The constant velocity joint of claim 1 or 5 wherein said mating surface of said outer component is cylindrical, and has a diameter of twice the value of said radius of said convex control surface.

10. In a constant velocity joint having a hollow outer component with longitudinal tracks in its inner surface, an inner component placed in said outer component with annular space therebetween, said inner component having tracks in its outer surface corresponding to those in said outer component, balls in said tracks of said outer and inner components for transmission of torque between the two, a cage having an axis and arranged in said annular space and having apertures retaining said balls in a ball plane, said cage having a spherical concave control surface having a concave center of curvature, said concave control surface facing a mating surface of said inner component, said cage having a convex spherical control surface having a convex center of curvature, said convex control surface facing a mating surface of said outer component, said concave and convex centers of curvature being located on said cage axis and being equally spaced on either side of said ball plane; the improvement comprising having said concave control surface extending substantially from a radial plane parallel to the ball plane and containing said concave center of curvature to the side remote from said ball plane, all other points on the remainder of the inner surface of said cage having a distance from said concave center of curvature greater than the radius of said concave control surface, said mating surface of said inner component passing substantially through said radial plane containing said convex center of curvature, the remainder of said outer surface of said inner component having a substantially similar contour as that of said inner surface of said cage when articulated around said concave center of curvature by half the maximum joint angle, said convex control surface extending substantially from a radial plane parallel to the ball plane and containing said convex center of curvature to the side remote from said ball plane, all other points on said outer surface of said cage adjacent to said convex control surface having a distance from said convex center of curvature less than the radius of said convex control surface, said mating surface of said outer component passing substantially through said radial plane containing said convex center of curvature, the remainder of said inner surface of said outer member having a substantially similar contour as that of said outer surface of said cage when articulated around said convex center of curvature by half the maximum joint angle.

* * * * *